(12) United States Patent
Bredin et al.

(10) Patent No.: US 7,849,056 B2
(45) Date of Patent: Dec. 7, 2010

(54) SYSTEM AND METHOD FOR MANAGING DATABASES ASSOCIATED WITH RESPECTIVE PERSONAL INFORMATION MANAGER SERVICE ACCOUNTS

(75) Inventors: Robert Bredin, Guelph (CA); Darrell R. May, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 91 days.

(21) Appl. No.: 11/673,022

(22) Filed: Feb. 9, 2007

(65) Prior Publication Data

US 2008/0195627 A1    Aug. 14, 2008

(51) Int. Cl.
G06F 7/00   (2006.01)
G06F 17/00   (2006.01)

(52) U.S. Cl. .................. 707/621; 707/616; 715/229

(58) Field of Classification Search .............. None
See application file for complete search history.

(56) References Cited

U.S. PATENT DOCUMENTS

| | | | |
|---|---|---|---|
| 4,626,836 A | | 12/1986 | Curtis et al. |
| 4,819,191 A | | 4/1989 | Scully et al. |
| 5,070,470 A | | 12/1991 | Scully et al. |
| 5,093,901 A | | 3/1992 | Cree et al. |
| 5,528,745 A | | 6/1996 | King et al. |
| 5,893,073 A | | 4/1999 | Kasso et al. |
| 5,943,652 A | | 8/1999 | Sisley et al. |
| 5,966,714 A | * | 10/1999 | Huang et al. ............ 707/201 |
| 5,968,131 A | * | 10/1999 | Mendez et al. ........... 709/246 |
| 6,016,478 A | | 1/2000 | Zhang et al. |
| 6,085,166 A | | 7/2000 | Beckhardt et al. |
| 6,101,480 A | | 8/2000 | Conmy et al. |
| 6,131,096 A | * | 10/2000 | Ng et al. ..................... 1/1 |
| 6,266,295 B1 | | 7/2001 | Parker et al. |

(Continued)

FOREIGN PATENT DOCUMENTS

EP    0276425 A2    8/1988

(Continued)

OTHER PUBLICATIONS

"Lotus Notes (R5) Client Calendaring", Internet Document, [online] Nov. 2, 2001, XP002302478, URL: http://web.archive.org/web/20011102175413/http://www.rhsmith.umd.edu/tr/LNR5Cal.htm [retrieved Oct. 22, 2004].

(Continued)

*Primary Examiner*—Pierre M Vital
*Assistant Examiner*—Augustine Obisesan
(74) *Attorney, Agent, or Firm*—David J. Johnson

(57) ABSTRACT

A method of managing databases at an electronic device, associated with respective ones of a first PIM service account and a second PIM service account. The method includes: receiving representative data of records at a server associated with the second PIM service account and obtaining data representative of records already present at the electronic device; comparing the data representative of the records at the server with the data representative of records already present at the electronic device; and determining with which of two of the databases ones of the records, at the server, for which representative data is received are associated, based on whether each of the records, at the server, for which representative data is received is already present in one of the two of the databases.

11 Claims, 8 Drawing Sheets

U.S. PATENT DOCUMENTS

| | | | |
|---|---|---|---|
| 6,272,074 B1 | 8/2001 | Winner | |
| 6,275,831 B1* | 8/2001 | Bodnar et al. | 707/201 |
| 6,360,217 B1 | 3/2002 | Gopal et al. | |
| 6,363,352 B1 | 3/2002 | Dailey et al. | |
| 6,388,772 B1 | 5/2002 | Williams et al. | |
| 6,404,884 B1* | 6/2002 | Marwell et al. | 379/265.13 |
| 6,457,062 B1* | 9/2002 | Pivowar et al. | 709/248 |
| 6,466,236 B1* | 10/2002 | Pivowar et al. | 715/835 |
| 6,466,951 B1* | 10/2002 | Birkler et al. | 707/201 |
| 6,470,329 B1 | 10/2002 | Livschitz | |
| 6,560,655 B1 | 5/2003 | Grambihler et al. | |
| 6,611,849 B1* | 8/2003 | Raff et al. | 707/203 |
| 6,732,080 B1 | 5/2004 | Blants | |
| 6,785,868 B1 | 8/2004 | Raff | |
| 6,820,096 B1 | 11/2004 | Kanevsky et al. | |
| 6,879,996 B1* | 4/2005 | Laves | 709/206 |
| 6,988,128 B1 | 1/2006 | Alexander et al. | |
| 6,999,731 B2 | 2/2006 | Cronin | |
| 6,999,993 B1 | 2/2006 | Shah et al. | |
| 7,082,402 B2 | 7/2006 | Conmy et al. | |
| 7,188,073 B1 | 3/2007 | Tam et al. | |
| 7,224,963 B2 | 5/2007 | Anderson et al. | |
| 7,343,312 B2 | 3/2008 | Capek et al. | |
| 7,359,920 B1* | 4/2008 | Rybicki et al. | 707/104.1 |
| 7,369,750 B2 | 5/2008 | Cheng et al. | |
| 7,395,221 B2 | 7/2008 | Doss et al. | |
| 7,584,278 B2 | 9/2009 | Rajarajan et al. | |
| 7,703,048 B2 | 4/2010 | Alford, Jr. et al. | |
| 7,716,078 B2 | 5/2010 | Bourne et al. | |
| 7,747,458 B2 | 6/2010 | Lyle et al. | |
| 7,747,459 B2 | 6/2010 | Doss et al. | |
| 7,752,066 B2 | 7/2010 | Doss et al. | |
| 2001/0014866 A1 | 8/2001 | Conmy et al. | |
| 2001/0014867 A1 | 8/2001 | Conmy | |
| 2001/0044903 A1 | 11/2001 | Yamamoto et al. | |
| 2002/0016729 A1 | 2/2002 | Breitenbach et al. | |
| 2002/0029161 A1 | 3/2002 | Brodersen et al. | |
| 2002/0044149 A1 | 4/2002 | McCarthy et al. | |
| 2002/0131565 A1 | 9/2002 | Scheuring et al. | |
| 2002/0138326 A1 | 9/2002 | Parker et al. | |
| 2002/0188609 A1* | 12/2002 | Fukuta et al. | 707/10 |
| 2003/0004773 A1 | 1/2003 | Clark et al. | |
| 2003/0023759 A1* | 1/2003 | Littleton et al. | 709/248 |
| 2003/0028399 A1 | 2/2003 | Davis et al. | |
| 2003/0030751 A1 | 2/2003 | Lupulescu et al. | |
| 2003/0046304 A1 | 3/2003 | Peskin et al. | |
| 2003/0097561 A1 | 5/2003 | Wheeler et al. | |
| 2003/0100336 A1 | 5/2003 | Cronin | |
| 2003/0149605 A1 | 8/2003 | Cragun et al. | |
| 2003/0149606 A1 | 8/2003 | Cragun et al. | |
| 2003/0171973 A1 | 9/2003 | Wilce et al. | |
| 2003/0204474 A1 | 10/2003 | Capek | |
| 2004/0031035 A1 | 2/2004 | Shiu et al. | |
| 2004/0054726 A1 | 3/2004 | Doss et al. | |
| 2004/0078256 A1 | 4/2004 | Glitho et al. | |
| 2004/0093290 A1 | 5/2004 | Doss et al. | |
| 2004/0125142 A1* | 7/2004 | Mock et al. | 345/765 |
| 2004/0139452 A1 | 7/2004 | Hope et al. | |
| 2004/0162882 A1 | 8/2004 | Mora | |
| 2004/0167877 A1 | 8/2004 | Thompson, III | |
| 2004/0216168 A1 | 10/2004 | Trovato et al. | |
| 2005/0020314 A1 | 1/2005 | Chol | |
| 2005/0085272 A1 | 4/2005 | Anderson et al. | |
| 2005/0102328 A1* | 5/2005 | Ring et al. | 707/201 |
| 2005/0114777 A1 | 5/2005 | Szeto | |
| 2005/0192857 A1 | 9/2005 | Levine | |
| 2005/0192973 A1* | 9/2005 | Sperling et al. | 707/100 |
| 2006/0041460 A1 | 2/2006 | Aaron | |
| 2006/0053380 A1 | 3/2006 | Spataro et al. | |
| 2006/0080427 A1 | 4/2006 | Yach | |
| 2006/0106881 A1* | 5/2006 | Leung et al. | 707/200 |
| 2006/0177034 A1 | 8/2006 | Reding et al. | |
| 2006/0190485 A1 | 8/2006 | Adams et al. | |
| 2006/0212465 A1 | 9/2006 | Fish | |
| 2006/0218224 A1* | 9/2006 | Agrawal et al. | 709/201 |
| 2007/0016646 A1* | 1/2007 | Tendjoukian et al. | 709/206 |
| 2007/0100856 A1* | 5/2007 | Ebbesen | 707/101 |
| 2007/0101284 A1 | 5/2007 | Shaw et al. | |
| 2007/0112880 A1* | 5/2007 | Yang et al. | 707/201 |
| 2007/0230282 A1 | 10/2007 | May et al. | |
| 2008/0141145 A1 | 6/2008 | Klausmeier | |
| 2009/0019367 A1 | 1/2009 | Cavagnari et al. | |

FOREIGN PATENT DOCUMENTS

| | | | |
|---|---|---|---|
| EP | 1569141 A | | 8/2005 |
| EP | 1655693 A | | 5/2006 |
| GB | 2375017 A | | 10/2002 |
| WO | 00/62201 A | | 10/2000 |
| WO | 20020044958 A | | 6/2002 |
| WO | WO 02/44958 | * | 6/2002 |
| WO | 2005/116892 A | | 12/2005 |

OTHER PUBLICATIONS

Faure D., et al., "KDE Kontact: an application integration framework—PIM components get together", Proceedings of the USENIX Annual Technical Conference 2004, pp. 115-126, XP002363478.

Internet archive wayback machine search result, [online] Jul. 27, 2007, XP002444552, URL: http://web.archive.org/web/*/http://docs.kde.org/stable/en/kdepim/korganizer/korganizer.pdf [retrieved Jul. 27, 2007].

Jarvie D. "Manuel de Kalarm", Internet Document, Jul. 21, 2005, pp. 1-50, XP002444649, URL:http://docs.kde.org/stable/fr/kdepim/kalarm/index.html [retrieved Jul. 27, 2007], pp. 3, 9-20, 31.

Nagendra Nyamgondalu, "Lotus Notes Calendar and Scheduling explained Part 1", Internet Document [online] Oct. 18, 2004, XP002363424, URL: http://www-128.ibm.com/developerworks/lotus/library/cs-pt1/ [retrieved Jan. 18, 2006], pp. 3-6.

Woelz, C. L. et al., "The Korganizer Handbook (Chapter 3-Chapter 7)", Internet Document, Aug. 29, 2005, pp. 1-62, XP002444605.

De Herrera, Chris: "Storing Personal and Business Information on Your Pocket PC or Smartphone"[Online] Apr. 16, 2005, pp. 1-4, XP002456519, Retrieved from the Internet: URL:http://www.pocketpcfaq.com/security/personal-business05.htm>[retrieved on Oct. 24, 2007].

Microsoft Corp., Microsoft Outlook 2000, 1995-1999, pages Msoutlook Fig.1-Fig.6.

* cited by examiner

SYSTEM AND METHOD FOR MANAGING DATABASES ASSOCIATED WITH RESPECTIVE PERSONAL INFORMATION MANAGER SERVICE ACCOUNTS

TECHNICAL FIELD

The present application relates to electronic devices with personal information manager records from more than one personal information manager service account and to the storage of records based on the account from which the records originated.

BACKGROUND

Many electronic devices such as desktop computers or portable electronic devices including simple cellular telephones, smart telephones, wireless personal digital assistants (PDAs), and laptop computers with wireless 802.11 or Bluetooth capabilities, include personal information manager (PIM) software applications including, for example, task applications and calendar or date book applications for scheduling and reviewing PIM records such as appointments and meetings in a graphical user interface.

With many portable electronic devices, PIM records such as calendar records can be created and saved using the appropriate PIM application such as the calendar application in the case of calendar records, of the portable electronic device. Records can also be created and saved on another electronic device such as a desktop or laptop computer, using an application on the desktop computer. These records can be synchronized or transferred to the portable electronic device by wire or wireless connection. Thus, the records are stored at both the desktop computer, for example, and at the portable electronic device such that the records at the electronic device mirror those at the desktop computer. This permits convenient viewing of the records, such as the calendar records at either the device or the desktop computer.

In some cases, users choose to keep different records in different PIM service accounts depending on the nature of the event. For example a user may choose to store all business related calendar events using a calendar service from one PIM service account while all personal related calendar events are stored using a calendar service from another PIM service account, for example using an internet service.

Unfortunately, when calendar records are synchronized or transferred from more than one PIM service account to the portable electronic device, either the calendar records already at the portable electronic device are deleted or the new calendar records from a second PIM service account are merged with the calendar records from the first PIM service account already at the portable electronic device. In the example above of a user with separate business and personal calendars, the calendar records are displayed and are indistinguishable in a single calendar view on the portable electronic device. Later synchronization with the first PIM service account results in transfer of all personal calendar records originating from the second PIM service account to the first PIM service account, thereby merging both personal and business calendar records at both the portable electronic device and the first PIM service account.

BRIEF DESCRIPTION OF THE DRAWINGS

The system and method for managing databases associated with respective PIM service accounts will be better understood with reference to the following description and to the Figures, in which.

DETAILED DESCRIPTION OF THE EMBODIMENTS

U.S. patent application Ser. No. 11/495,879, filed Jul. 31, 2006, the entire content of which is incorporated herein by reference, teaches a method for maintaining a plurality of calendar databases at a portable electronic device in which calendar events from different PIM service accounts are stored in separate, respective databases at the portable electronic device. The calendar events can also be viewed based on selection of one or multiple ones of these databases for viewing.

With the addition of these databases at the portable electronic device, however, the calendar events previously stored at the portable electronic device, remain in a database at a default PIM service account, regardless of the origin of these calendar records or the PIM service account with which the calendar records are associated. All records are merged at the default PIM service account as a result of synchronization as described above. Thus, while calendar records synchronized to the portable electronic device after the multiple calendar databases are enabled on the portable electronic device, are stored in respective databases associated with the respective PIM service accounts, calendar records previously stored on the device are stored in the default database, regardless of the PIM service account with which they are related.

To address this problem, a method of managing databases associated with respective ones of PIM service accounts is provided. In one aspect, the method includes obtaining representative data of records at a server associated with the second PIM service account and obtaining data representative of records already present at the electronic device. The data representative of the records at the service is compared with the data representative of records already present at the electronic device. From the comparison, it is determined which of two of the databases at the electronic device ones of the records for which representative data of records at the server is obtained, are associated with based on whether each of the records at the server for which representative data is received is already present in one of the databases at the electronic device.

The PIM records in the default database are then sorted based on which of the plurality of PIM service accounts, each of the PIM records in the default database is associated with.

Throughout the present description, reference is made to calendar records. It will be appreciated that where calendar records are referred to in relation to an electronic calendar service that is part of a PIM service account, the calendar records are data representative of the calendar records, such as Java-based objects.

Figure 1:
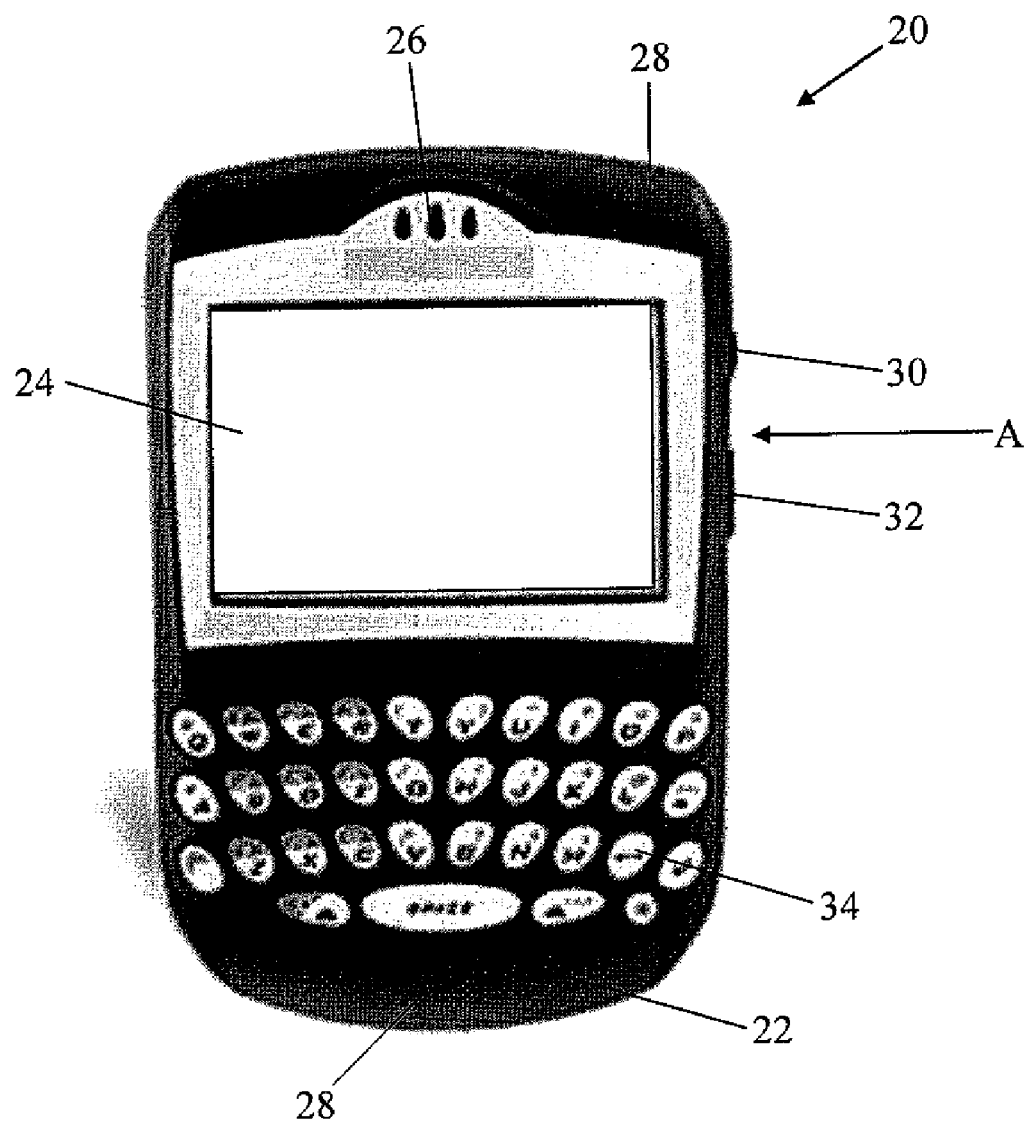
FIG. 1 is a representation of a portable electronic device for managing databases associated with respective PIM service accounts in accordance with one embodiment.

Referring to FIG. 1, a portable electronic device for managing databases associated with respective PIM service accounts in accordance with one embodiment is indicated generally by the numeral 20. In the present embodiment, the portable electronic device 20 is based on the computing environment and functionality of a hand-held wireless communication device. It will be understood, however, that the portable electronic device 20 is not limited to a hand-held wireless communication device. Other portable electronic devices are possible, such as cellular telephones, smart telephones, and laptop computers. Referring again to the present embodiment, the portable electronic device 20 includes a housing 22 that frames an LCD display 24, a speaker 26, an LED indicator 28, a trackwheel 30, an exit key 32, a key pad 34, and a microphone 36. The trackwheel 30 and the exit key 32 can be inwardly depressed along the path of arrow "A" as a means to provide additional user-input. The housing 22 is made from a suitable material as will occur to those skilled in the art, and can be stored, for example, in a holster (not shown) that includes an attachment for attaching to a user's belt.

Figure 2:
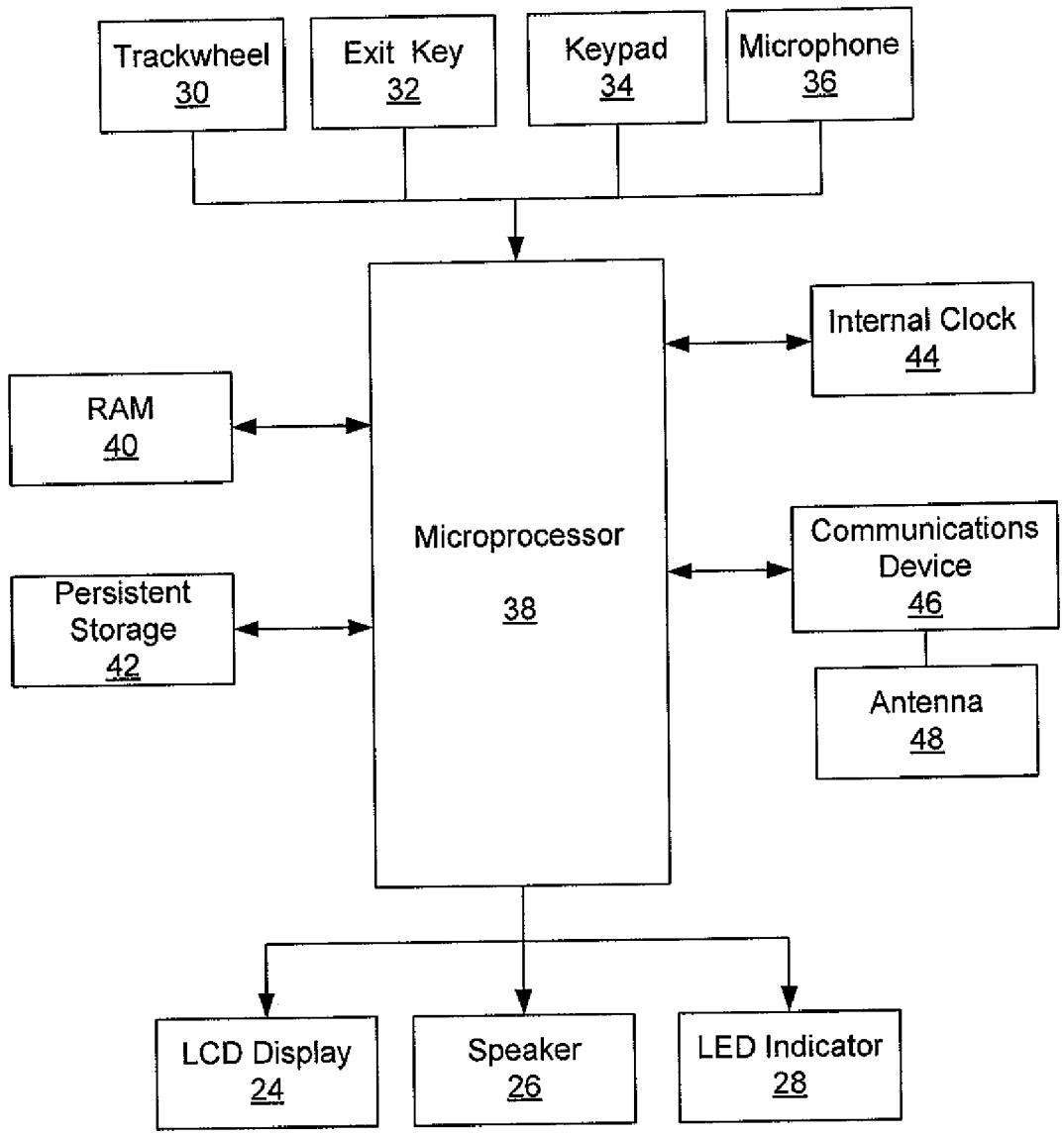
FIG. 2 is a block diagram of certain internal components within the portable electronic device of FIG. 1.

Referring now to FIG. 2, a block diagram of certain internal components, including internal components within the portable electronic device 20, is shown. The portable electronic device 20 is based on a microcomputer that includes a microprocessor 38 connected to a random access memory (RAM) unit 40 and a persistent storage device 42 that is responsible for various non-volatile storage functions of the portable electronic device 20. Operating system software executable by the microprocessor 38 is stored in the persistent storage device 42, which in the present embodiment is flash memory. It will be appreciated, however, that the operating system software can be stored in other types of memory such as read only memory (ROM). The microprocessor 38 receives input from various input devices including the trackwheel 30, the exit key 32, and the keypad 34, and outputs to various output devices including the LCD display 24, the speaker 26 and the LED indicator 28. The microprocessor 38 is also connected to an internal clock 44.

In the present embodiment, the portable electronic device 20 is a two-way RF communication device having voice and data communication capabilities. The portable electronic device 20 also includes internet communication capabilities. Two-way RF communication is facilitated by a communications device 46 that is used to connect to and operate with a data-only network such as Mobitex or DataTAC, or a complex voice and data network such as a GSM/GPRS, CDMA, EDGE, UMTS or CDMA2000 network, via the antenna 48.

For data communication, signals are received, for example, an email message or downloaded Web page, at the communications device 46, processed and sent to the microprocessor 38 where the signals are further processed for display on the LCD display 24. Data, such as an email message can also be composed using one or more of the input devices such as the key pad 34 or the trackwheel 30. The data is sent through the communications device 46 to the network to which the portable electronic device 20 connects.

For voice communication, a received signal is processed by the communications device 46, through the microprocessor 38, and output to the speaker 26. Signals are generated at the microphone 36 for transmission using the communications device 46, over the voice network to which the portable electronic device 20 connects.

Although not shown, a battery provides power to all active elements of the portable electronic device 20.

The persistent storage device 42 also stores a plurality of applications executable by the microprocessor 38 that enable the portable electronic device 20 to perform certain operations including the communication operations referred to above. Other applications software is provided including, for example, an email application, a Web browser application, an address book application, calendar applications, a profiles application, and others.

It will be appreciated that email messages are received at the portable electronic device 20 by data communication referred to above. Each email message that is received includes a variety of information including a date of receipt, time of receipt and sender email information. Email messages are composed or viewed on the portable electronic device by selection of the email message application, causing execution of the email message application by the microprocessor 38.

The Web browser application permits locating and displaying of Web pages from the World Wide Web.

The address book application provides a graphical user interface for creating, viewing and managing address book data including contacts names, addresses, email addresses, telephone numbers, and other information when executed by the microprocessor 38.

It will also be appreciated that the calendar applications are used for displaying and storing calendar events such as appointments, lectures, exams, movies, meetings, performances, dinners, ceremonies, etc., when executed by the processor 36. Each calendared event includes a variety of information including a date and time of the event.

The profiles application is used for selection and customization of notification modes by user selection from a number of different notifications set for the occurrence of specific events. Each profile can be customized to give rise to different notification output for various applications on the portable electronic device 20.

Figure 3:
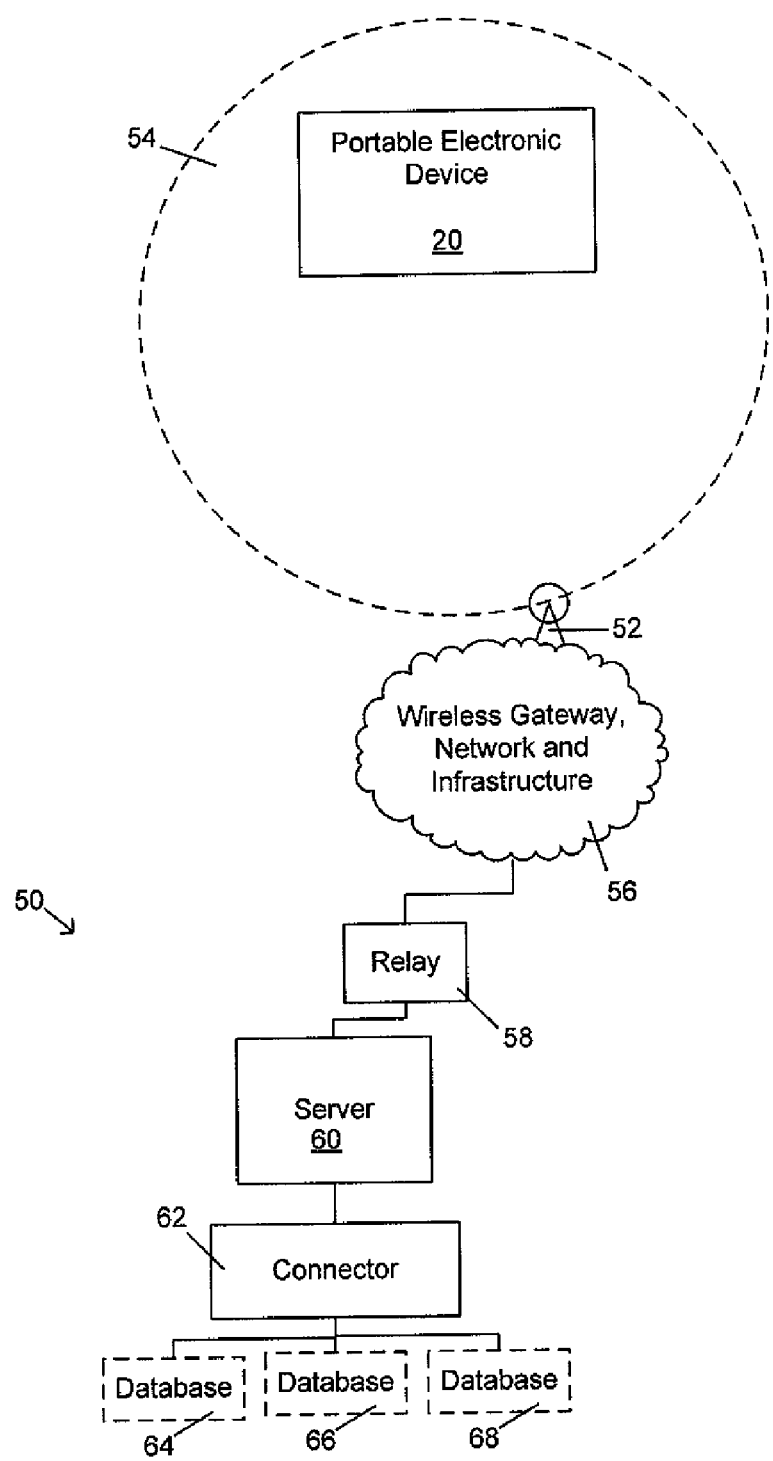
FIG. 3 is an exemplary functional block diagram of the portable electronic device of FIG. 1 in communication with a radio communication system.

FIG. 3 shows an overview of an exemplary communication system in which the portable electronic device 20 can be used. The communication system is indicated generally by the numeral 50 and provides for communications with portable electronic devices including the portable electronic device 20, as shown. The portable electronic device 20 and the communication system 20 are operable to effect communications over a radio communications channel therebetween. Data originating at the portable electronic device 20 is communicated to the communication system 50 by way of the radio communications channel. Similarly, data originating at the communication system 50 is communicated from the communication system 50 to the portable electronic device 20 by way of the radio communications channel, thereby providing data to the portable electronic device 20.

For the purpose of illustration, the communication system 50 is functionally represented in FIG. 3 and a single base station 52 is shown. The base station 52 defines a coverage area, or cell 54 within which communications between the base station 52 and the portable electronic device 20 can be effectuated. It will be appreciated that the portable electronic device 20 is movable within the cell 54 and can be moved to coverage areas defined by other cells that are not illustrated in the present example. The communication system 50 includes the base station 52 that is part of a wireless network and infrastructure 56 that provides a link to the portable electronic device 20. The wireless network and infrastructure 56 includes a number of base stations (not shown) that provide the other cells referred to above. Data is delivered to the portable electronic device 20 via wireless transmission from the base station 52. Similarly, data is sent from the portable electronic device 20 via wireless transmission to the base station 52.

Wireless networks and infrastructures include, for example, data-centric wireless networks, voice-centric wireless networks, or dual-mode wireless networks. For the purpose of the present exemplary embodiment, the wireless network and infrastructure 56 includes a dual-mode wireless network that supports both voice and data communications over the same physical base stations.

A relay device 58 is connected to the base station 52 through the wireless network and infrastructure 56, and to an internet server 60. It will be understood that the functions provided by the relay device 60 and the internet server 60 can be embodied in the same device. The internet server 60 is functionally coupled through a connector 62, to databases, of which, three exemplary databases including a database 64, a database 66 and a database 68, are shown. Calendar records are maintained in the databases 64, 66, 68.

Figure 4:
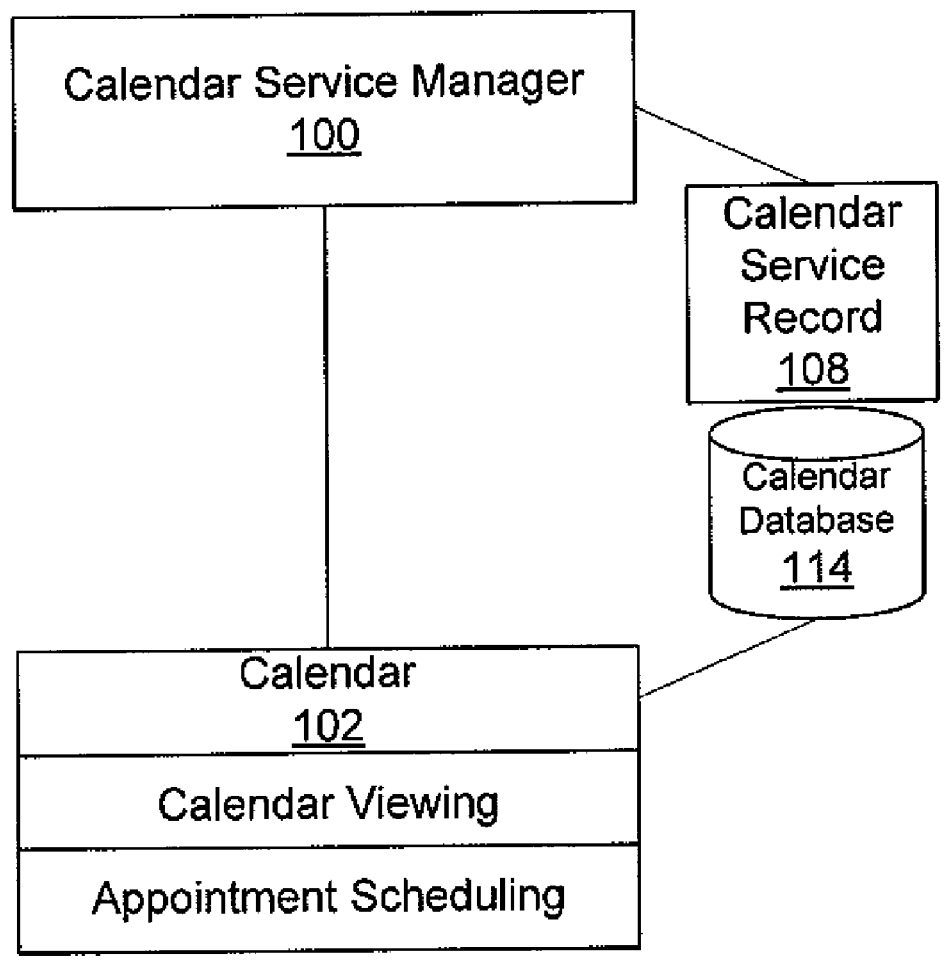
FIG. 4 is a schematic illustration of the relationship between certain functional components of the portable electronic device including a single calendar database associated with a calendar service.

Referring now to FIG. 4, the persistent storage device 42 of the portable electronic device 20 includes the applications software referred to above and also includes a calendar service manager application 100. The calendar service manager application 100 begins on startup of the portable electronic device 20 and runs in the background on the portable electronic device 20. The calendar service manager application 100 is responsible for receiving service record changes including additions, modifications and deletions, for maintaining and managing databases for storage of calendar events and for managing connections to different calendar services that are part of respective PIM service accounts. The calendar application 102 includes both calendar-viewing for displaying calendar event information and appointment-scheduling for creating and scheduling calendar events for display using the calendar viewing function.

Figure 5:
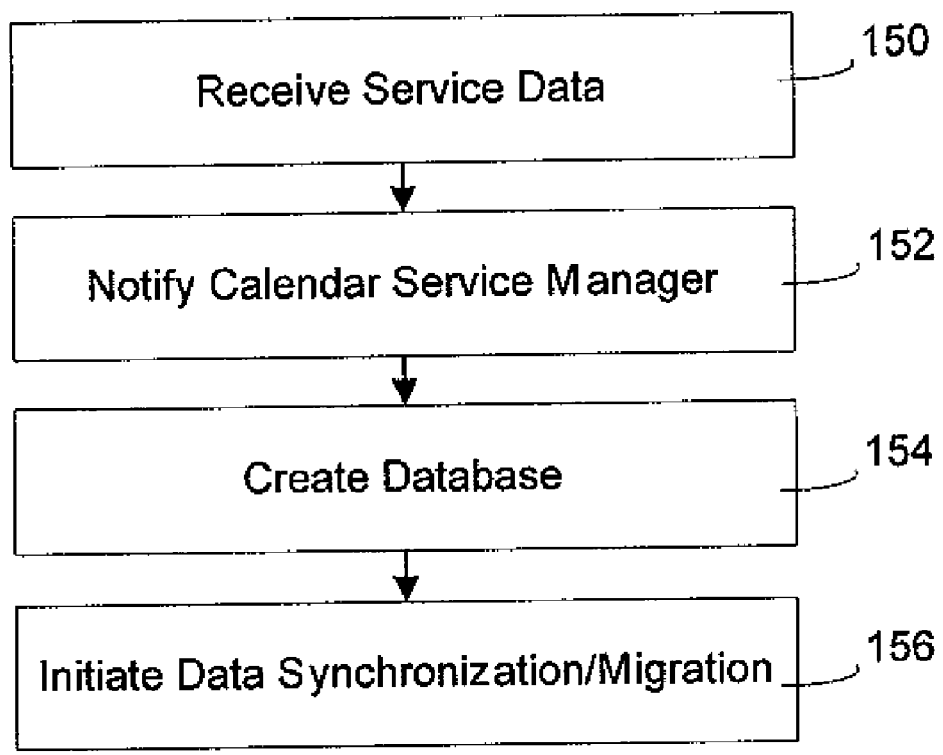
FIG. 5 is a flowchart illustrating steps carried out at the portable electronic device during the creation and management of a new database associated with a new calendar service.

Referring to FIG. 5, there is shown a flowchart illustrating steps carried out at the portable electronic device 20 during the creation and management of a new database associated with a new calendar service of a PIM service account. Coding of software for carrying out the steps illustrated is well within the scope of a person of ordinary skill in the art. A calendar service record, such as the exemplary calendar service record 108 shown in FIG. 4, is created any time a new calendar service is provisioned. The calendar service records are contained within a service book (not depicted). In other words, when a new calendar service is added to enable viewing and storage of calendar events on the portable electronic device 20, a calendar service record is created. A data packet is received at the portable electronic device 20 including information about a service that is parsed to create the service record (step 150). The data packet is received from a server, such as the internet server 60 shown in FIG. 3 to add the calendar records from a calendar database of a PIM service account, such as, for example, the database 64 shown in FIG. 3. The calendar service record includes information from the data packet such as a unique identifier or address of the calendar service with which it is associated (UID), thereby identifying the calendar service to which the calendar events belong, who the record is for (User ID), and the capabilities.

The capabilities include information for data exchange with the calendar service such as routing information, content types and synchronization capability (for example, full synchronization capability). From the information in the calendar service record, a notification is sent to the calendar service manager application 100 in the form of an addition, update or removal. In the case of an addition of a calendar service, an addition notification is sent to the calendar service manager application (step 152) from the service book.

The calendar service manager application 100 acts as an intermediary or middle manager by managing the calendar services for the calendar application. The calendar service manager application 100 uses the information embedded in the notification from step 152 to create the database (step 154) and begins synchronization with the calendar service (step 156). Given that the calendar service is the first calendar service that is enabled on the portable electronic device 20, the calendar database 114 is the first calendar database on the portable electronic device 20 and this calendar database 114 is set as the default calendar database. The calendar service manager 100 determines that this is the first calendar database enabled and therefore initiates the synchronization. The default calendar database 114 is then synchronized with the calendar service. It will be appreciated that during synchronization, the calendar service provides all calendar records to the portable electronic device 20 for storage of the calendar records at the default calendar database 114. Using the example of the internet server 60 and the PIM service account calendar database 64, the calendar database 64 is synchronized with the calendar database 114 at the portable electronic device 20.

Figure 6:
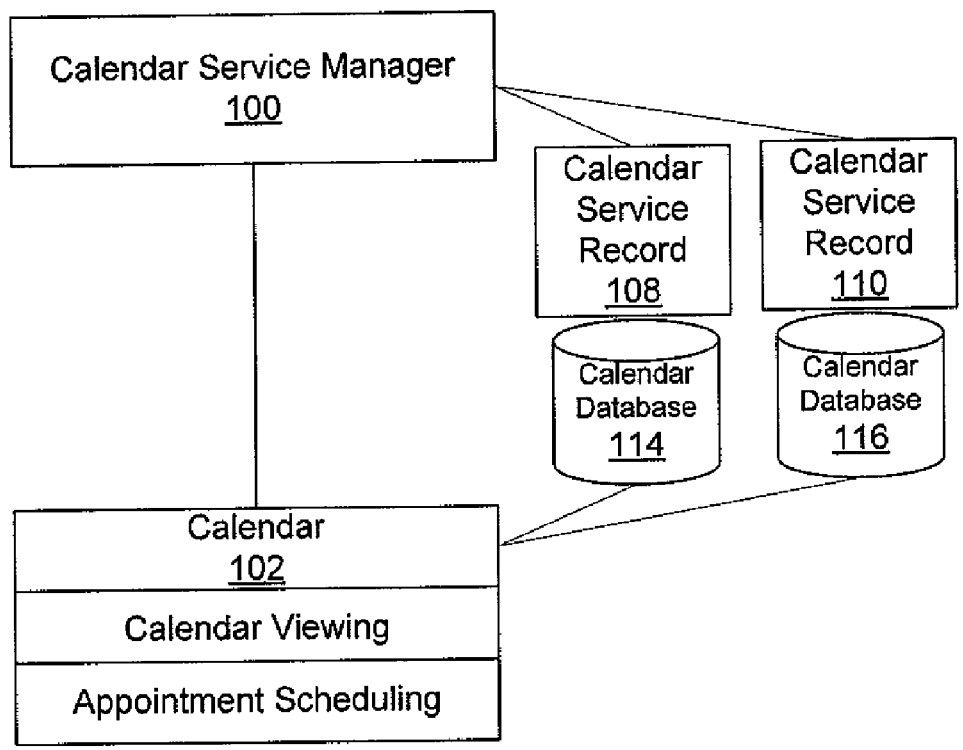
FIG. 6 is a schematic illustration of the relationship between certain functional components of the portable electronic device including two calendar databases, each associated with a respective calendar service.

Referring again to FIG. 5 and to FIG. 6, a second calendar service record, such as the exemplary calendar service record 110, is created when a new calendar service is provisioned. As described above, a data packet is received at the portable electronic device 20 including information about the calendar service that is parsed to create the service record (step 150). Again, the calendar service record includes information from the data packet such as a unique identifier or address of the calendar service with which it is associated (UID), thereby identifying the calendar service to which the calendar events belong, who the record is for (User ID), and the capabilities. From the information in the calendar service record, a notification is sent to the calendar service manager application 100 in the form of an addition notification (step 152) from the service book.

The calendar service manager application 100 uses the information embedded in the notification from step 152 to create the second calendar database 116 (step 154). In this case, the calendar service manager application 100 determines that another calendar service has already been enabled. Thus, a default calendar database 114 already exists. Rather than a synchronization, the calendar service manager application 100 begins a data migration as described below.

Figure 7:
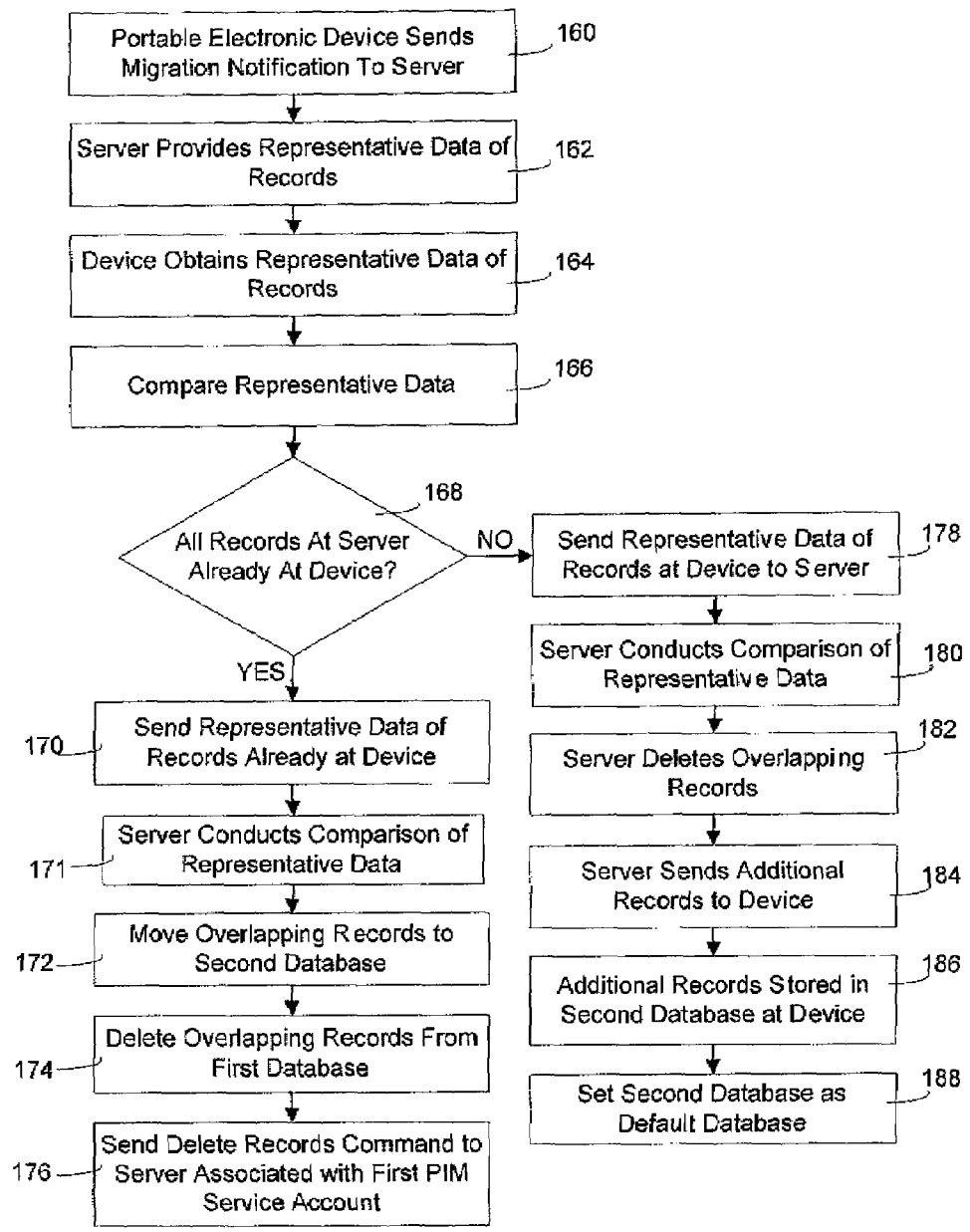
FIG. 7 is a flowchart illustrating steps carried out at both the portable electronic device and at the server responsible for the calendar service during data migration.

Reference is now made to FIG. 7 which shows a flowchart illustrating steps carried out at both the portable electronic device 20 and at the server responsible for the calendar service during data migration. Coding of software for carrying out the steps illustrated is well within the scope of a person of ordinary skill in the art. For exemplary purposes, the server responsible for the calendar service is indicated herein as the server 60 of FIG. 3 and the calendar database of the second calendar service is the database 66. It will be appreciated that it is not necessary that the same server be responsible for both calendar services and that other calendar services for which other servers are responsible, can be enabled for synchronization or data migration to the portable electronic device 20.

The portable electronic device 20 begins by sending a migration notification to the server (for exemplary purposes, the migration notification is sent to the server 60) (step 160). The migration notification is a response to the server 60 after the second calendar database 116 is enabled at the portable electronic device 20, to request information from the server 60. The server 60 receives the migration notification and responds by providing representative data for each data record in the database 66 (step 162). Thus, the server 62 retrieves each of the data records at the database 66 and obtains representative data for each data record by generating a record hash for each data record. Each record hash is determined by the server 62 by performing, for example, computation of check sums as well as other hash function computations. The record hashes uniquely represent each respective calendar record and are sent to the portable electronic device 20 (step 164).

Upon receipt of the representative data in the form of record hashes, the portable electronic device 20 then retrieves the data records from the default database. The default calendar database is the previously enabled calendar database that is set as the default. It will be noted that the data records are retrieved from the default calendar database 114 and not the newly enabled calendar database 116 that was created for the new calendar service for which the representative data is sent to the portable electronic device 20 at step 164. The microprocessor 38 of the portable electronic device 20 then generates a hash value for each of the calendar records retrieved from the default calendar database 114 at step 164, thereby obtaining representative data of the calendar records (step 164). The representative data is then compared by comparing the hash values received from the server 60 to the hash values generated at the portable electronic device 20 to determine matching hash values, thereby determining matching calendar records (step 166). From this comparison, the portable electronic device 20 determines if all the records from the database 66 are already present in the default database 114 at the portable electronic device 20 (step 168). In other words, the portable electronic device 20 determines if there are corresponding hash values generated at the portable electronic device 20 for each and every hash value received from the server 60.

If there are corresponding hash values generated at the portable electronic device 20 for each of the hash values received from the server 60, then the portable electronic device 20 has a superset of the calendar records at the second PIM service account and therefore all the records from the database 66 are already at the default database 114 of the portable electronic device 20. In this case, the portable electronic device 20 sends the representative data in the form of the hash values to the server 60 (step 170). When the server 60 receives the representative data, the server 60 then determines that all of the calendar records from the database 66 are already present at the portable electronic device, by conducting a comparison similar to the comparison carried out at the portable electronic device 20 at step 166 (step 171). Thus, the server 60 determines that no calendar records are to be sent to the portable electronic device 20 (since all of the calendar records from the database 66 are already present in the database 114).

After sending the representative data in the form of hash values to the server 60, the portable electronic device 20 proceeds with migrating data from the default calendar database 114 to the second calendar database 116 (step 172). To migrate data, all of the calendar records for which the representative hash values generated at the portable electronic device 20 are determined to match with the representative hash values received from the server 601 are stored in the second calendar database 116. Copies of the calendar records that are saved at the second calendar database 116, are deleted from the default calendar database 114 (step 174). A delete calendar records command is then sent to the server associated with the PIM service account that corresponds with the default database, to delete all calendar records corresponding to those calendar records deleted from the default database at the portable electronic device 20 (step 176). Following the example above, the delete calendar records command is sent to the server 60 to delete the calendar records at the database 64 that correspond with the calendar records deleted from the default database 64 at the portable electronic device 20.

Returning to the determination at step 168, if there are not corresponding hash values generated at the portable electronic device 20 for all of the hash values received from the server 60, then the portable electronic device 20 has a subset of the calendar records at the second PIM service account and therefore there are calendar records from the database 66 that are not already at the default database 114 of the portable electronic device 20. In this case, the portable electronic device 20 sends the representative data in the form of the hash values to the server 60 (step 178). When the server 60 receives the representative data, the server 60 then conducts a comparison of the hash values generated at the server 60 with the hash values generated at the portable electronic device 20 and received at step 178 (step 180). From this comparison, the server 60 determines which of the calendar records at the database 66 are already present at the portable electronic device 20 by determining which hash values generated at the server 60 match with hash values generated at the portable electronic device 20. The calendar records for which corresponding calendar records are already present at the portable electronic device 20, are deleted from the database 66 by the server 60 (step 182). The additional calendar records, for which corresponding calendar records are not already present at the portable electronic device 20, are then sent from the server 60 to the portable electronic device 20 (step 184) for storage in the second calendar database 116 (step 186). The second calendar database 116 is then set as the default calendar database at the portable electronic device 20.

It will be appreciated that the process is repeated if another calendar service is provisioned. In this case, the default database from which calendar records are retrieved for generating hash values at the portable electronic device 20 at step 162, depends on which of the two previously created databases is set as the default database. Thus, the default database can be either one of the previously created databases 114, 116, depending on the determination made at step 168 during data migration at the portable electronic device 20.

In the above-described embodiments, the representative data of the calendar records is described as hash values generated at the server 60 and at the portable electronic device 20. The representative data is not limited to hash values, however. Other representative data can be used instead of hash values. For example, rather than generating hash values, a unique identifier (UID) for each calendar record can be used as representative data, uniquely identifying the respective calendar record. Thus, rather than generating hash values, the server 60 retrieves the UID for each calendar record. Similarly, the portable electronic device 20 retrieves the UID for each calendar record at the default database of the portable electronic device 20. It will be appreciated that the comparison of representative data at step 164 and at steps 171 and 180 is a comparison of UIDs.

*Further Examples*

The following examples are intended to be illustrative only and are not intended to limit the scope of the present invention.

Figure 8:
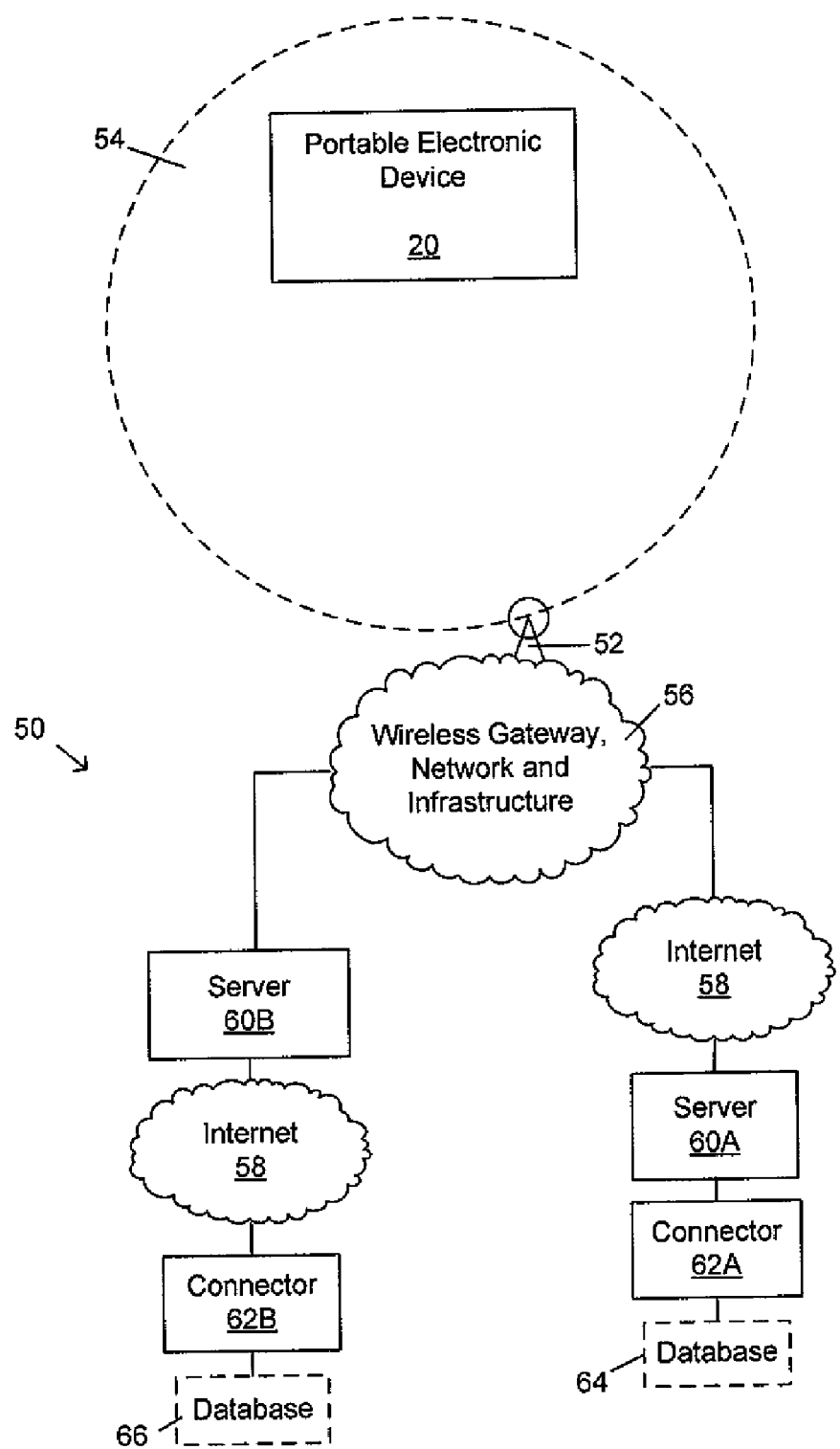
FIG. 8 is another exemplary functional block diagram of the portable electronic device in communication with a radio communication system.

Reference is made to FIG. 8 for the purpose of the present example. Where possible, the numerals used previously in describing FIG. 3 will be used again for the purpose of consistency. According to the present example, a user of the portable electronic device 20 uses two calendar services, a business calendar service maintained at a database 64 in association with an enterprise server 60A and a personal calendar service maintained at a database 66 in association with an Internet server 60B. As shown, the enterprise server 60A is connected to the database 64 through a connector 62A and to the portable electronic device 20 through the Internet 58 and the wireless network and infrastructure 56. The Internet server 60B is connected to the database 66 through a connector 62B and through the Internet 58. The Internet server 60B is also connected to the portable electronic device 20 through the wireless network and infrastructure 56.

For the purpose of the present example, the database 64 is a superset including all of the calendar records from the database 66 associated with the Internet server 60B. This occurs as a result of previous storage of all calendar records in a single database at the portable electronic device 20 and subsequently at the database 64 by way of synchronization of the single database at the portable electronic device 20 and the database 64. Thus, previous transfer of calendar records from the database 66 to the portable electronic device 20, merges the records from the database 66 and the database 64 at the portable electronic device 20. Subsequent synchronization of the calendar database at the portable electronic device 20 with the database 64 associated with the enterprise server 60A merges the calendar records from the database 66 associated with the Internet server 60B with the calendar records at the database 64 associated with the enterprise server 60A. The portable electronic device 20 is then updated to provide for separate calendar databases.

Referring to FIGS. 4, 5, the calendar service associated with the enterprise server 60A is first enabled. A data packet is received at the portable electronic device 20 including information about the enterprise service calendar service is received at the portable electronic device 20 and parsed to create the enterprise calendar service record 108 (step 150). Next, the addition notification is sent to the calendar service manager application (step 152) and the calendar service manager creates the database 114 for storage of calendar records from the enterprise calendar service (step 154). The calendar database 114 at the portable electronic device 20 is then synchronized with the calendar database 64 associated with the enterprise server 60A. Thus, each of the calendar records from the database 64 are stored at the database 114 of the portable electronic device 20.

Next, the calendar service associated with the Internet server 60B is enabled in a similar manner, resulting in the creation of the database 116 at the portable electronic device 20. Rather than a synchronization, the calendar service manager application 100 begins a data migration (step 152).

Referring now to FIG. 7, because this is the second calendar service enabled at the portable electronic device 20, a migration notification is sent to the Internet server 60B (step 160). The Internet server 60B then responds by providing representative data in the form of representative hash values for each data record at the database 66 (step 162). The portable electronic device 20 obtains representative data of the calendar records present in the database 114 by retrieving the calendar records and generating the representative hash values (step 164). Next, the representative hash values received from the Internet server 60B are compared with the representative hash values generated at the portable electronic device 20 to determine matching hash values (step 166). It is determined that all of the records received from the Internet server 60B are already present at the portable electronic device 20, in the database 114 associated with the enterprise server 60A. Thus, the portable electronic device 20 sends representative data of the calendar records present in the database 114, in the form of the hash values, to the Internet server 60B (step 170). When the Internet server 60B receives the representative data, the Internet server 60B then determines that all of the calendar records from the database 66 are already present at the portable electronic device 20 by carrying out a comparison (step 171). As indicated above, no calendar records are transmitted from the server 60B to the portable electronic device 20.

Next, the portable electronic device 20 saves all calendar records from the database 114, for which the representative hash values from the portable electronic device 20 are determined to match the representative hash values received from the Internet server 60B, in the database 116 associated with the Internet server 60B (step 172). Copies of the calendar records that are saved at the database 116, are deleted from the calendar database 114 (step 174) and a delete calendar records command is then sent to the enterprise server 60A to delete the calendar records that correspond with calendar records deleted from the database 114 (step 176). In this case, the database 114 remains the default database.

Referring again to FIG. 8, another example will now be described. For the purpose of simplicity, the premise of the present example is the same as that of the above example and thus, the database 64 is a superset including all of the calendar records from the database 66 associated with the Internet server 60B. In this case, however, rather than first enabling the calendar service associated with the enterprise server 60A, the calendar service associated with the Internet server 60B is first enabled and synchronized with the database 114 at the portable electronic device 20.

Next, the calendar service associated with the enterprise server 60A is enabled in a similar manner, resulting in the creation of the database 116 at the portable electronic device 20. Rather than a synchronization, the calendar service manager application 100 begins a data migration (step 152).

Referring to FIG. 7, because this is the second calendar service enabled at the portable electronic device 20, a migration notification is sent to the enterprise server 60A (step 160). The enterprise server 60A then responds by providing representative data in the form of representative hash values for each data record at the database 64 (step 162). The portable electronic device 20 obtains representative data of the calendar records present in the database 114 by retrieving the calendar records from the database 114 and generating the representative hash values (step 164). Next, the representative hash values received from the enterprise server 60A are compared with the representative hash values generated at the portable electronic device 20 to determine matching hash values (step 166). It is determined that only some of the records received from the enterprise server 60A are already present at the portable electronic device 20, in the database 114 associated with the Internet server 60B. Thus, the portable electronic device 20 sends representative data of the calendar records present in the database 114, in the form of the hash values, to the enterprise server 60A (step 170). When the enterprise server 60A receives the representative data, the enterprise server 60A determines which of the calendar records from the database 64 are already present at the portable electronic device 20 by carrying out a comparison (step 180). The calendar records at the database 64 for which corresponding calendar records are already present at the portable electronic device 20, are deleted from the database 64 by the Internet server 60A (step 182). The additional records, for which no corresponding calendar records are already present at the portable electronic device 20 are sent from the Internet server 60A to the portable electronic device 20 (step 184). These additional records are received at the portable electronic device 20 and are stored in the database 116 associated with the Internet server 60A (step 186). Finally the database 116 associated with the Internet server 60A is set as the default database.

As indicated above, unique identifiers (UIDs) can be used as the representative data of the calendar records, rather than hash values. Thus, rather than generating hash values, a unique identifier (UID) for each calendar record is used as representative data, uniquely identifying the respective calendar record.

It will be understood that while the above examples are described in relation to calendar services that are part of PIM service accounts, database management at the electronic device 20 is not limited to calendar databases. Other databases associated with PIM service accounts can be managed in a similar manner. Thus, for example, tasks, electronic messages, or address book databases can be managed in order to determine which of two databases at the electronic device, certain records belong to.

According to one aspect of an embodiment, there is provided a method of managing databases at an electronic device, associated with respective ones of a first PIM service account and a second PIM service account. The method includes: receiving representative data of records at a server associated with the second PIM service account and obtaining data representative of records already present at the electronic device; comparing the data representative of the records at the server with the data representative of records already present at the electronic device; determining with which of two of the databases ones of the records, at the server, for which representative data is received are associated, based on whether each of the records, at the server, for which representative data is received is already present in one of the two of the databases.

According to another aspect of an embodiment, there is provided an electronic device. The electronic device includes a memory for storage of a plurality of PIM record databases associated with first and second PIM service accounts, a display device, a user input device, a communications device and antenna for receiving and sending data, and a processor connected to the memory, the display device, the user input device, and the communications device. The processor is operable for executing a program stored in the memory for receiving data representative of records from a server associated with the second PIM service account, comparing the data representative of the records from the server with data representative of records already present at the electronic device, determining with which of two of the databases ones of the records, at the server, for which representative data is received are associated, based on whether each of the records, at the server, for which representative data is received is already present in one of the two of the databases, and storing ones of the records for which representative data is received in the databases based on the determining.

According to still another aspect, there is provided a computer program product for managing databases at an electronic device, associated with respective ones of a first PIM service account and a second PIM service account. The computer program product includes a computer-readable medium having computer-readable code embodied therein for receiving representative data of records at a server associated with the second PIM service account and obtaining data representative of records already present at the electronic device, comparing the data representative of the records at the server with the data representative of records already present at the electronic device, and determining with which of two of the databases ones of the records, at the server, for which representative data is received are associated, based on whether each of the records, at the server, for which representative data is received is already present in one of the two of the databases.

Advantageously, records from different PIM service accounts can be sorted into databases associated with the PIM service accounts based on the determination of which of the PIM service accounts the records belong to. Thus, for example, calendar records from different PIM service accounts are stored in separate databases. This allows separation and organization of the records.

While the embodiments described herein are directed to particular implementations of the system and method for managing databases associated with respective ones of a plurality of calendar services of personal information manager service accounts, it will be understood that modifications and variations to these embodiments are within the sphere and scope of the present application. For example, the order of many of the steps described above may differ. Further, the management of databases is not limited to management of calendar databases. For example, migrations can be carried out for any PIM service databases at the portable electronic device 20, thereby separating data from various different ones of PIM services. Many other modifications and variations may occur to those skilled in the art. All such modifications and variations are believed to be within the sphere and scope of the present application.

The invention claimed is:

1. A method in an electronic device in which a default database is initially associated with both of a default PIM (personal information manager) service account and a second PIM service account, the method comprising:
   in addition to the default database, establishing in the electronic device a second database to store synchronized records associated with only the second PIM service account, wherein the default database initially contains merged database records previously stored in the default database regardless of with which PIM service account each merged database record originated, such that the source of each merged database record is indistinguishable in the default database;
   reconciling the merged database records with server database records associated with the second PIM service account to determine if all of the server database records are already present in the default database;
   if all of the server database records are already present in the default database:
      identifying a subset of the merged database records in the default database as overlapping records, overlapping records being server database records associated with the second PIM service account that are already present in the default database; and
      moving the overlapping records from the default database to the second database.

2. The method of claim 1 further comprising
after moving the overlapping records, sending a delete records command to a server with an instruction to delete overlapping records from a server database associated with the default PIM service account.

3. The method of claim 1 further comprising:
providing data representative of the merged database records to a server associated with the server database records, wherein the server is configured to delete server overlapping records from the server database;
receiving additional server database records;
storing the additional server database records in the second database; and
setting the second database as a new default database.

4. The method of claim 1, comprising synchronizing with the default PIM service account prior to enabling synchronization of the second PIM service account.

5. The method of claim 1, further comprising:
maintaining the default database for storing only first PIM records associated with the first PIM service account; and
maintaining the second database for storing only second PIM records associated with the second PIM service account.

6. The method of claim 1, wherein the first PIM service account is associated with a first calendar service, and the second PIM service account is associated with a second calendar service.

7. The method of claim 1, wherein reconciling the merged database records with server database records comprises:
receiving representative data values from the server, each representative data value being associated with a respective record of the server database records;
obtaining comparison data values, each comparison data value being associated with a respective record of the merged database records already present in the default database; and
comparing the representative data values with the comparison data values to determine if all of the server database records are already present in the default database.

8. An electronic device: comprising:
memory for storing a plurality of PIM (personal information manager) record databases, including at least a default database initially associated with both of a default PIM service account and a second PIM service account, wherein the default database initially contains merged database records previously stored in the default database regardless of with which PIM service account each merged database record originated, such that the source of each merged database record is indistinguishable in the default database;
a processor configured to:
establish in the memory a second database to store synchronized records associated with only the second PIM service account;
reconcile the merged database records in the default database with server database records associated with the second PIM service account to determine if all of the server database records are already present in the default database;
if all of the server database records are already present in the default database:
identify a subset of the merged database records in the default database as overlapping records, overlapping records being server database records associated with the second PIM service account that are already present in the default database; and
move the overlapping records from the default database to the second database.

9. The electronic device of claim 8, wherein the processor is further configured to:
after moving the overlapping records, send a delete records command to a server with an instruction to delete overlapping records from a server database associated with the default PIM service account.

10. The electronic device of claim 8, wherein the processor is further configured to:
if all of the server database records are not already present in the default database:
provide data representative of the merged database records to a server associated with the server database records, wherein the server is configured to delete server overlapping records from the server database;
receive additional server database records;
store the additional server database records in the second database; and
set the second database as a new default database.

11. A computer program product, comprising:
computer readable medium having computer readable code embodying the method of:
creating a second database to store synchronized records associated with only a second PIM (personal information manager) service account;
reconciling merged database records in a default database with server database records associated with the second PIM service account to determine if all of the server database records are already present in the default database, the default database initially associated with both of a default PIM service account and the second PIM service account, wherein the default database initially contains merged database records previously stored in the default database regardless of with which PIM service account each merged database record originated, such that the source of each merged database record is indistinguishable in the default database;
if all of the server database records are already present in the default database:
identifying a subset of the merged database records in the default database as overlapping records, overlapping records being server database records that are already present in the default database; and
moving the overlapping records from the default database to the second database.

* * * * *